Oct. 25, 1932.   H. S. BAILEY   1,884,510
ORE OXIDIZING MUFFLED RETORT FURNACE
Filed Dec. 26, 1928   9 Sheets-Sheet 1
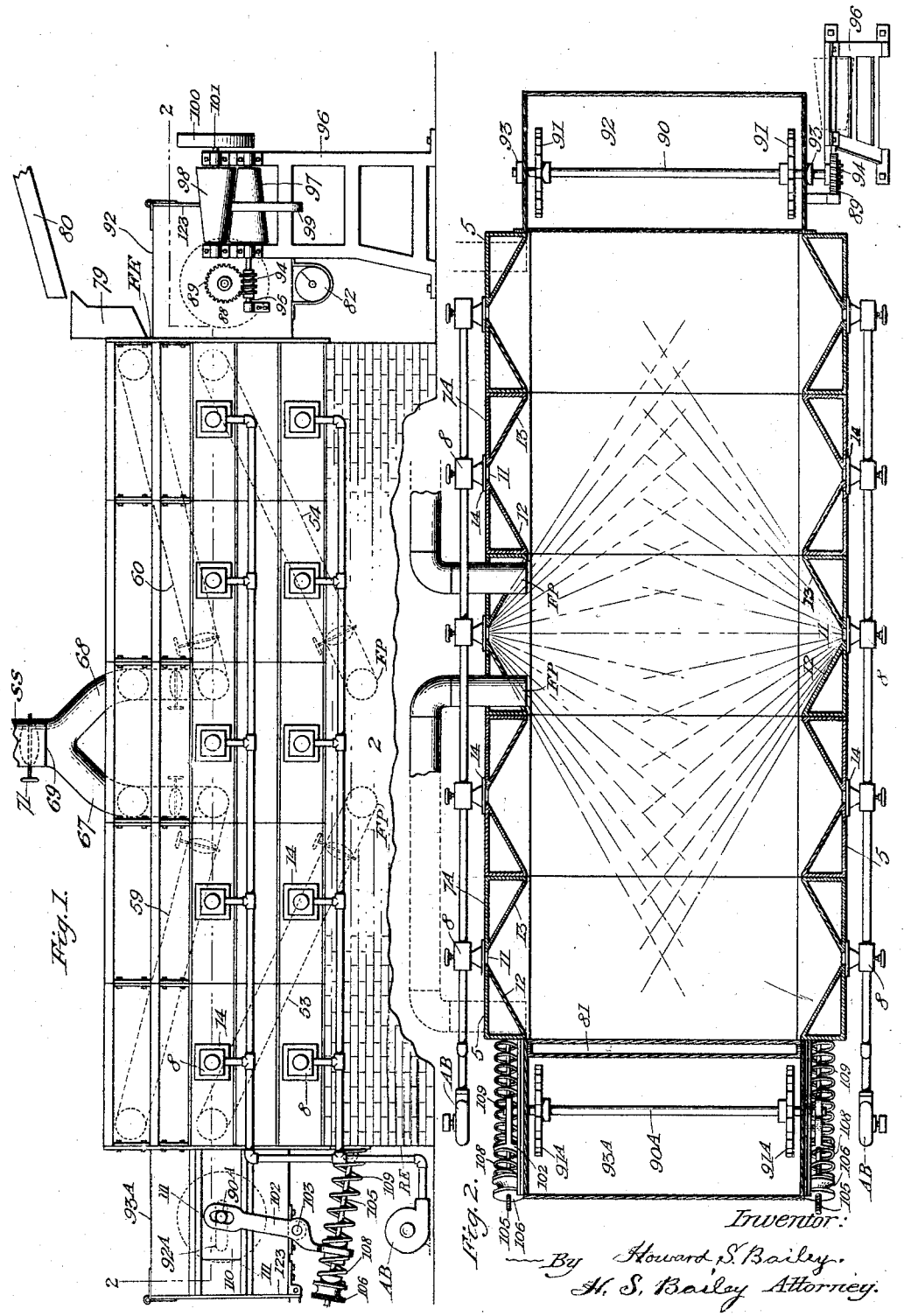

Oct. 25, 1932. H. S. BAILEY 1,884,510
ORE OXIDIZING MUFFLED RETORT FURNACE
Filed Dec. 26, 1928 9 Sheets-Sheet 2
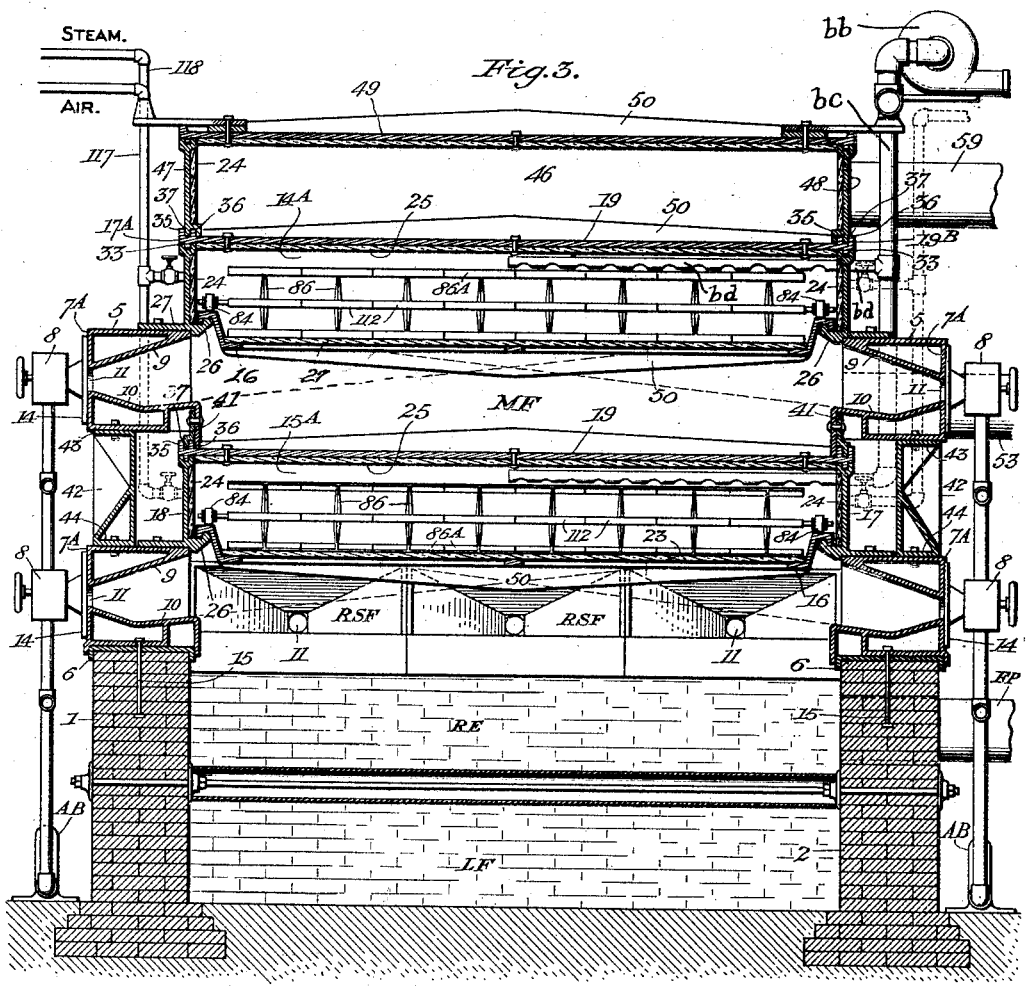
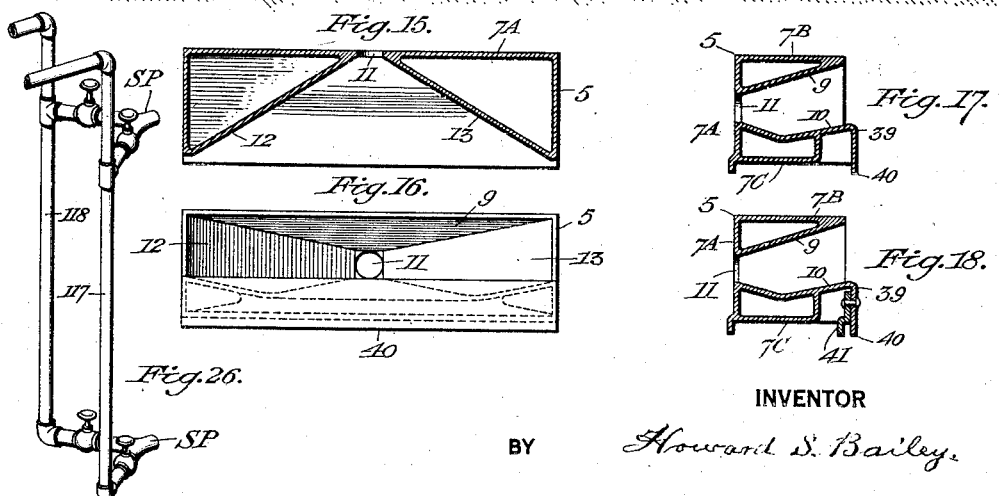
INVENTOR
Howard S. Bailey
BY
H. S. Bailey ATTORNEY

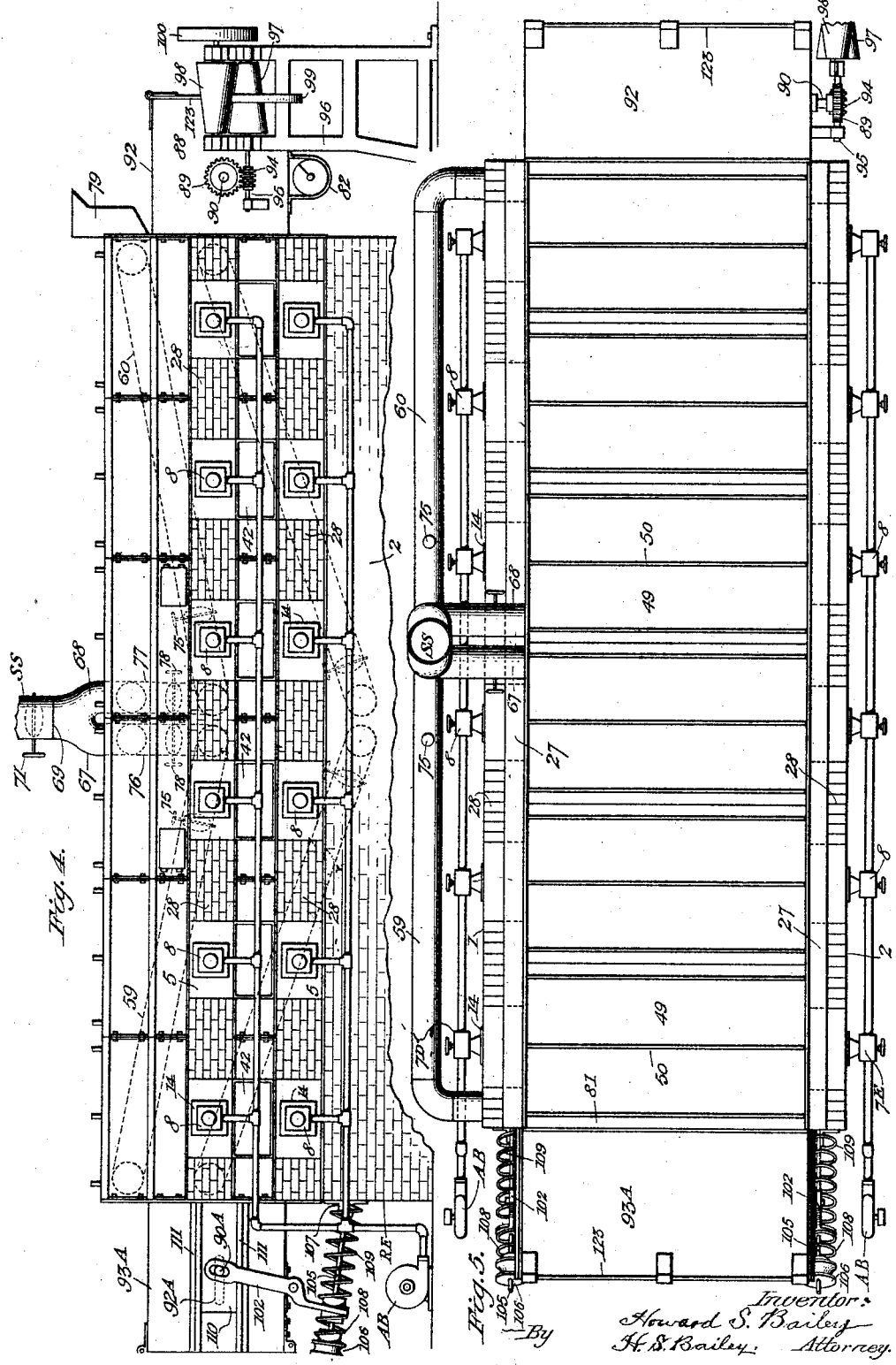

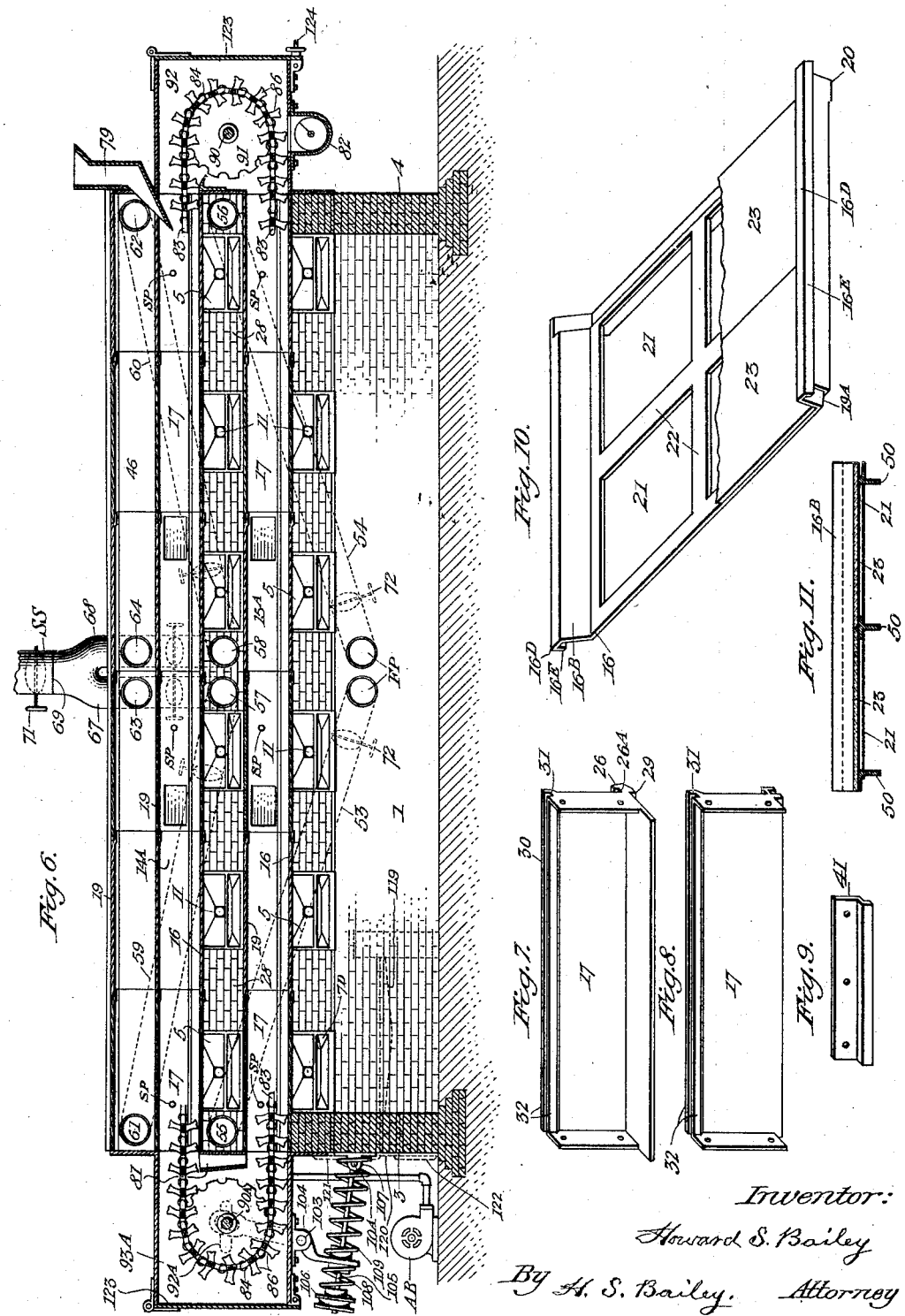

Oct. 25, 1932.  H. S. BAILEY  1,884,510
ORE OXIDIZING MUFFLED RETORT FURNACE
Filed Dec. 26, 1928   9 Sheets-Sheet 5
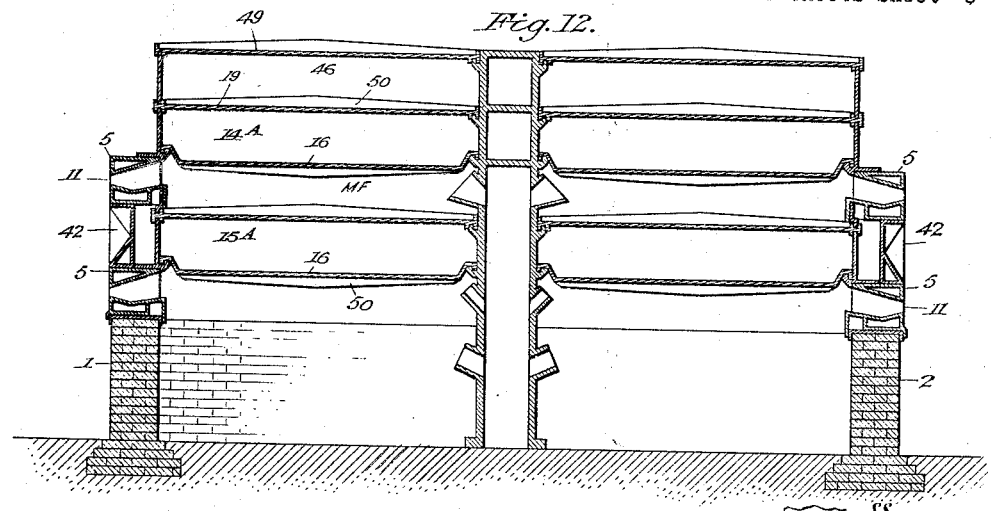
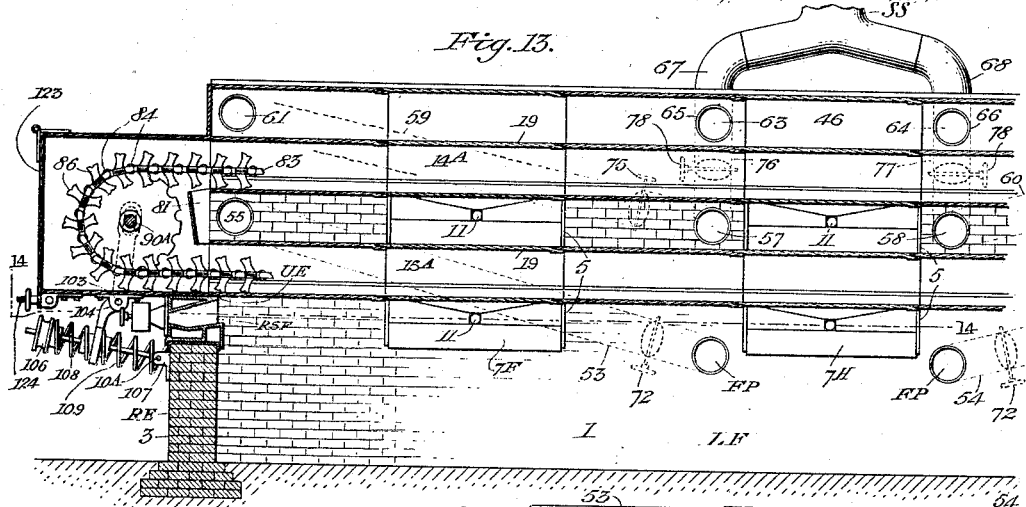
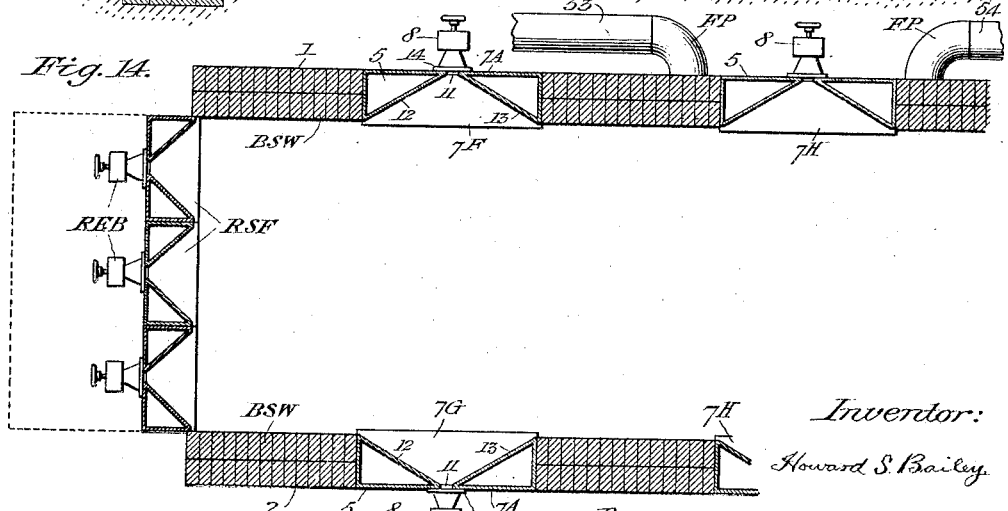
Inventor:
Howard S. Bailey
By H. S. Bailey, Attorney.

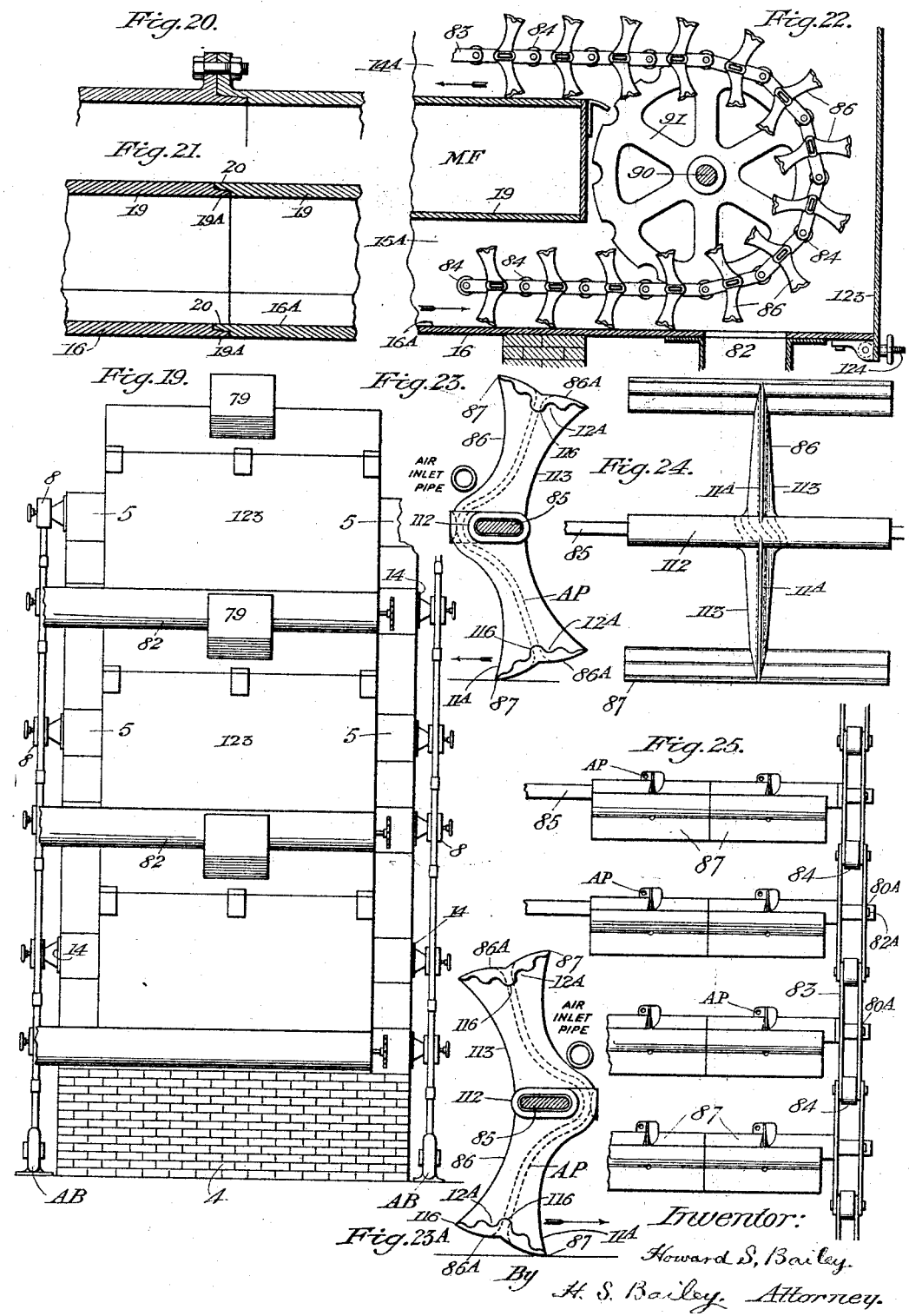

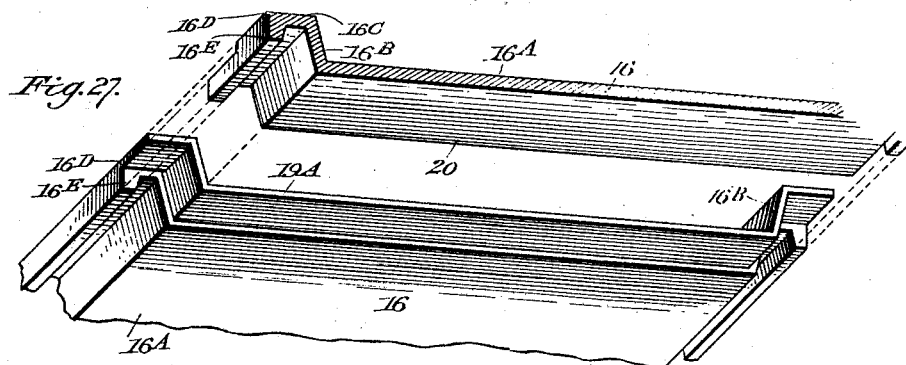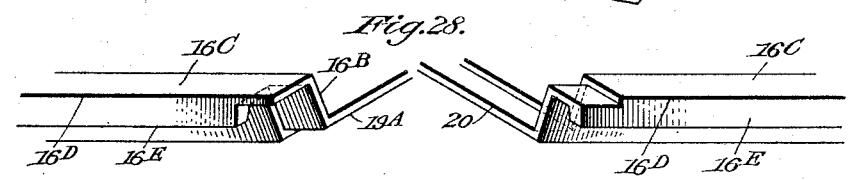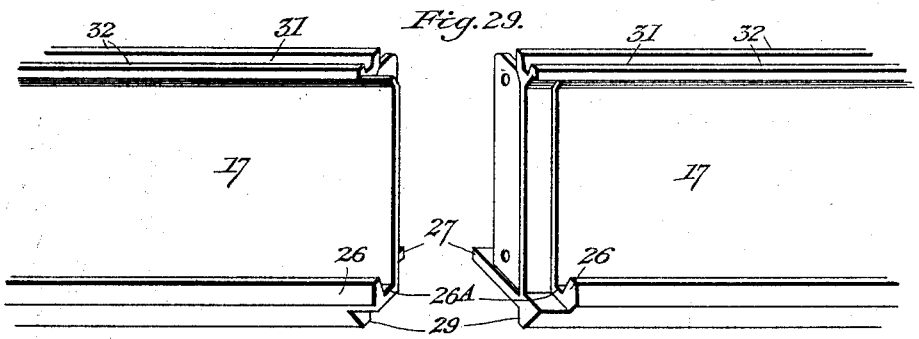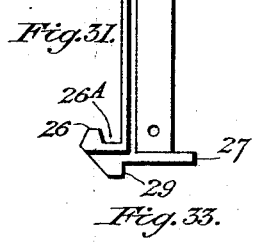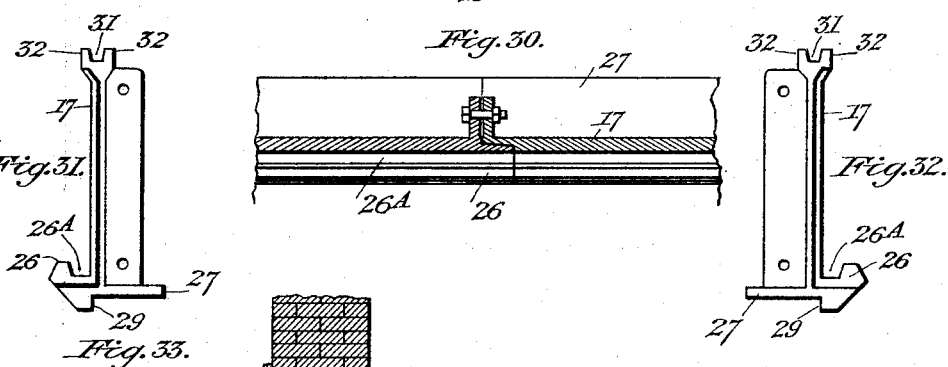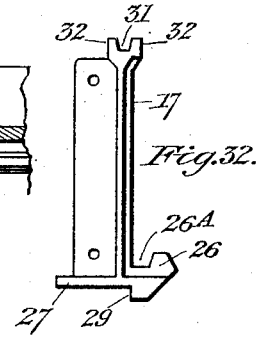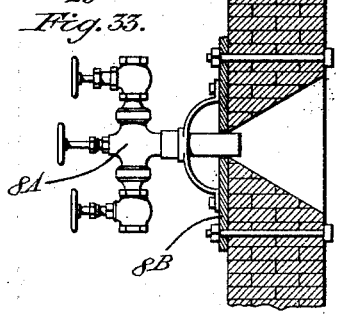

Oct. 25, 1932.  H. S. BAILEY  1,884,510
ORE OXIDIZING MUFFLED RETORT FURNACE
Filed Dec. 26, 1928  9 Sheets-Sheet 8
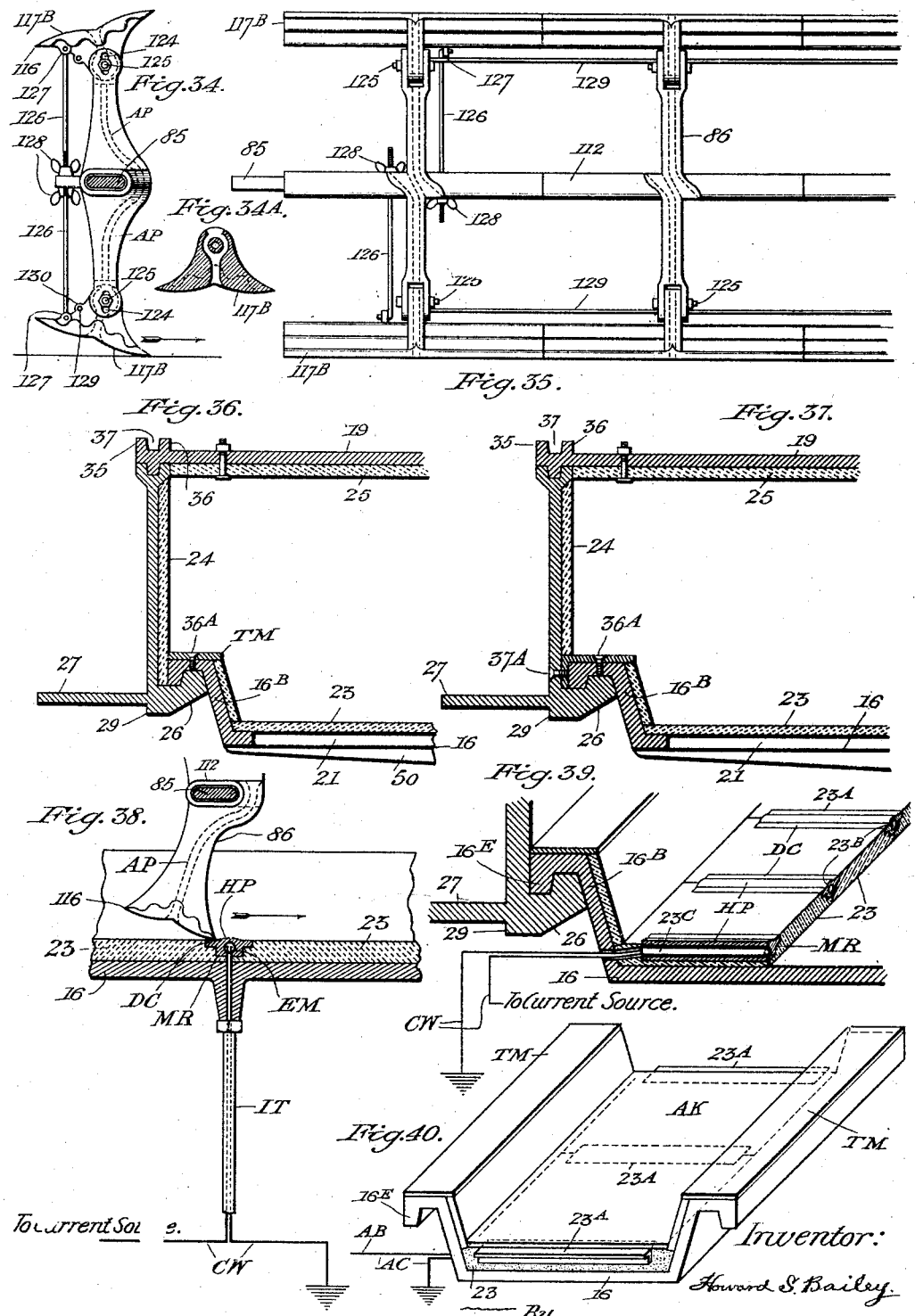
Inventor:
Howard S. Bailey.
By H. S. Bailey. Attorney.

Oct. 25, 1932.  H. S. BAILEY  1,884,510
ORE OXIDIZING MUFFLED RETORT FURNACE
Filed Dec. 26, 1928   9 Sheets-Sheet 9
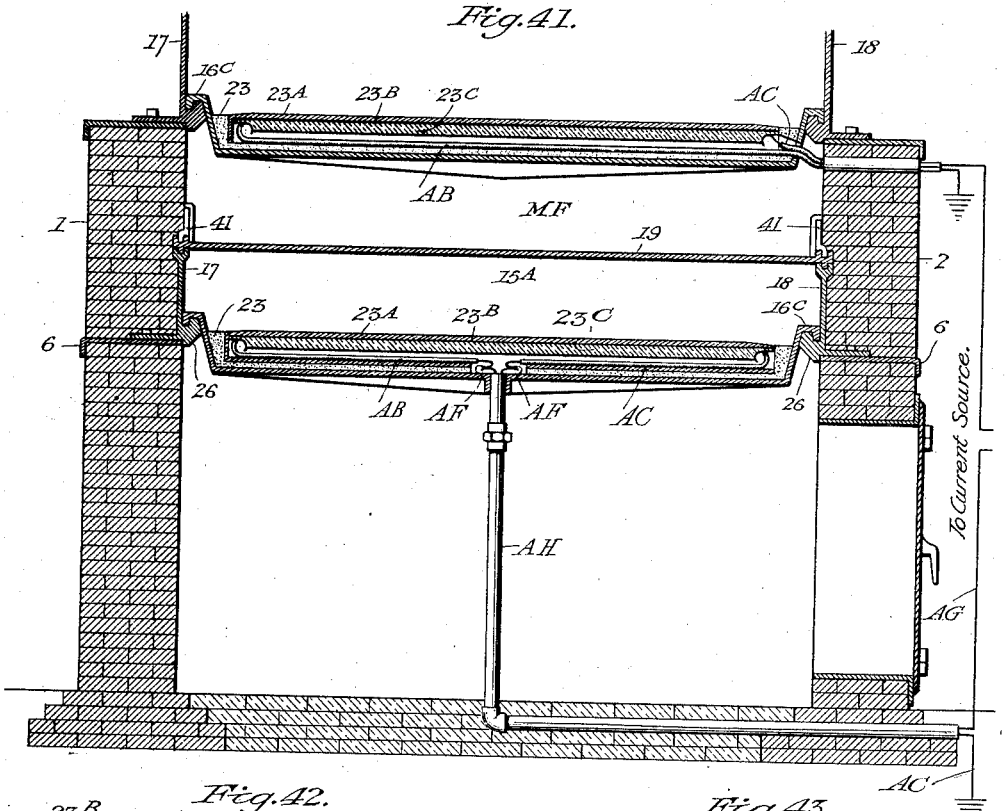
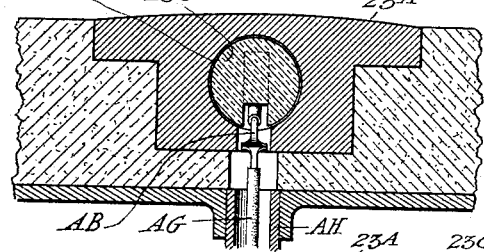
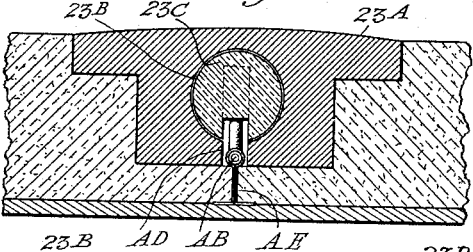
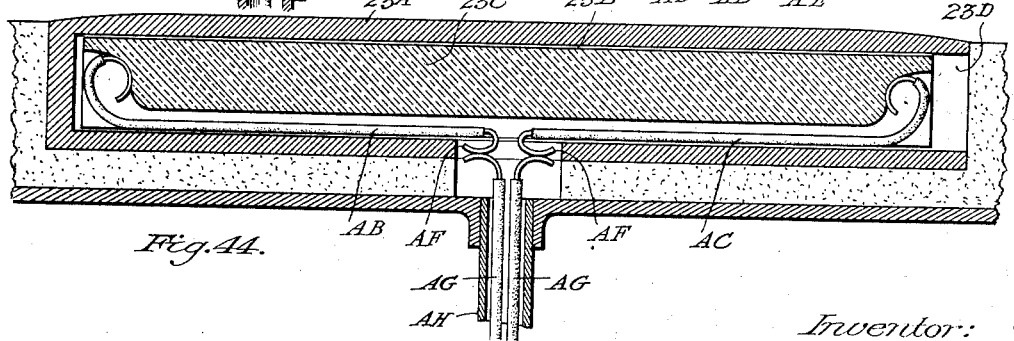

Patented Oct. 25, 1932

1,884,510

UNITED STATES PATENT OFFICE

HOWARD S. BAILEY, OF DENVER, COLORADO

ORE OXIDIZING MUFFLED RETORT FURNACE

Application filed December 26, 1928. Serial No. 328,524.

My invention relates to an ore oxidizing muffled retort furnace, for treating refractory and complex rebellious ores, so that their values can be recovered by subsequent treatments.

The objects of my invention are:—

First.—To provide a muffled retort furnace that will give to refractory and complex rebellious ores, an oxidizing treatment that will thoroughly volatilize from them the sulphur, antimonial, arsenical and other volatile elements, and that will chemically change them from a sulphide to a sulphate and oxidized condition, in which condition their gold, silver and other metals can be readily recovered.

Second.—To provide ore roasting floor sections that have their side edges turned upward to form dish shaped floor members and also formed to stand at a sufficient distance from the side walls of the heating flue, to allow the heating gases to flow directly against the outer surfaces of said edges. This improvement is a very valuable one as it corrects a fualty construction and arrangement of the furnaces that have been built and put into use in the past, in which the opposite side edges of the floor sections upon which the ore is oxidized, have been built right up against the inside surfaces of the outside supporting walls of the furnace. These walls of the heating flues, and also the opposite side edges of the floor sections of the old and commonly constructed furnaces are only a few inches from the atmosphere, generally the thickness of a thin metal wall or of a nine or twelve inch wall of brick or other material and it is very difficult to heat them hot enough to give a thorough desulphurizing roast without raising the temperature in the flues much hotter than it is necessary to heat the central portions of the floor sections. The result is that the ore at and near the center of the floor sections is subjected to a higher heat than is necessary to thoroughly desulphurize them before the ore at the sides is oxidized and when the heat is carried up sufficiently to oxidize the ore at the sides the ore in the center is so over oxidized in some instances as to prevent the recovery of a large percentage of the values by subsequent treatments. But by means of the construction of the floor sections as shown herein, the heat flowing directly against the opposite side edges of the floor sections heats these side edges as quickly and thoroughly as the middles of the floor sections, and consequently the ore that lays against their inside surfaces is just as quickly and as thoroughly oxidized as the ore in the central portions of the floors.

Third.—To provide retorts adapted to be heated by electricity, oil, gas or coal. Any of these fuels may be used for heating the opposite side edges and bottoms of the floor sections of the different retorts placed above each other as shown in the drawings.

Fourth.—To provide means for giving to the ore a continuous forward movement a lifting and a turning back and a turning over movement upon itself on the floor of the retort, as it is moved through the retorts and to provide new and novel mechanism for operating the ore moving and rabbling mechanism.

I attain these objects by the mechanism illustrated in the accompanying drawings in which—

Figure 1 is a side elevation of my improved double retort furnace, showing a double row of oil burners for heating said retorts, and improved means for maintaining tension on the endless rabbler and conveyor; the furnace being made up of five sections.

Figure 2 is a horizontal sectional view thereof on the line 2—2 of Figure 1; the sections to which the oil burners are secured being the full length of the furnace sections, and having flared inner side and end faces for directing the heat laterally and up against the floors of the retorts.

Figure 3 is an enlarged transverse sectional view through the furnace.

Figure 4 is a side elevation of a furnace made up of six sections and showing burner castings which are of less length than the retort sections, the spaces between the burner castings being walled up with brick.

Figure 5 is a plan view of Figure 4.

Figure 6 is a vertical longitudinal sectional view of Figure 4.

Figures 7 and 8 are perspective views of the side plates of the retort sections.

Figure 9 is a perspective view of a strip which is bolted to each burner casting of the upper row of burner castings.

Figure 10 is a perspective view of one of the retort floor sections having an open bottom, covered with fire clay slabs.

Figure 11 is a transverse sectional view through Figure 10.

Figure 12 is a transverse sectional view showing two double retort furnaces arranged as single structure.

Figure 13 is a vertical longitudinal sectional view through a portion of a furnace showing the oil burners arranged in each alternate section, and oil burners in the rear end wall beneath the lower retort.

Figure 14 is a horizontal sectional view on the line 14—14 of Figure 13.

Figure 15 is a horizontal sectional view of one of the oil burner castings shown in Figure 13.

Figure 16 is a front view thereof.

Figure 17 is a vertical transverse sectional view taken centrally through the same.

Figure 18 is a view similar to Figure 17, but showing the strip secured thereto which is illustrated in Figure 9.

Figure 19 is an end view showing three double retorts, arranged one upon the other.

Figure 20 is a sectional view showing the manner of connecting the ends of the side plates of the retorts, and the lock joint connection of said ends.

Figure 21 is a sectional view showing the lock joint connection between the ends of the top of the retorts and the ends of the floor plates.

Figure 22 is a sectional view of one end portion of the retort showing the improved ore rabbler and conveyor.

Figures 23 and 23A are enlarged side views of one of the rabbler sections, as it appears in moving either toward the left or right, and showing the air passage in dotted lines which extend from the hub, through both spokes and out through the scraper.

Figure 24 is a front view of Figure 23.

Figure 25 is a plan view of a portion of the conveyor.

Figure 26 is a perspective view of the pipe arrangement for admitting air or steam to the retorts.

Figure 27 is a perspective view of the adjoining ends of two of the floor sections looking toward the under side thereof, and showing the manner of their interlocking connection.

Figure 28 is a perspective view of portions of the adjoining ends of two of the floor sections looking toward the upper sides thereof.

Figure 29 is a perspective view of portions of two of the side plates, showing the manner in which their adjoining ends are interlockingly connected.

Figure 30 is a horizontal sectional view through portions of a pair of the connected side plates shown in Figure 29.

Figures 31 and 32 are end views respectively of the two side plates.

Figure 33 is a sectional view showing the manner in which an oil burner is applied to a solid brick wall.

Figure 34 is a side view of one of the ore moving shovels showing its shoveling blade made separate from the spokes and pivotally connected to the same in such a manner as to permit its high or heel end to be vertically adjusted by means including a threaded rod and cooperating mechanism to different depths of ore on the ore oxidizing floors of the retorts, while the shoveling edge of the shoveling blade is bearing against the floors of the retorts.

Figure 34A is a sectional view through one of the shoveling blades.

Figure 35 is an end view of Figure 34. It illustrates however, a set of the shovels mounted on a cross rod of the retort in order to show that it is only necessary to provide the two outside shovels with the vertical rods and hand wheels threaded to them in order to raise or lower all of the shovels in unison with the opposite end shovels, the cross rod extending through all of the other shovels.

Figures 36 and 37 illustrate two slightly different arrangements of a sheet steel track member that is secured to the top surfaces of the opposite ends of the floor members of the retorts. In Figure 36 it is made of a flat strip of thin steel. In Figure 37 it is made of a strip of right angular structural steel and extends down over the end of each of the opposite ends of the floor members and is preferably releasably secured to the side members of the retorts by cap screws which are positioned under the trestles that support the upper retort so that the brick work of the outside walls does not have to be removed to unscrew them far enough to release the steel tracks and the floor sections from the inside surfaces of the side members of the retorts.

Figure 38 illustrates an electrical apparatus for heating the ore inside of the lower retort. The heating assists in making the chemical change that takes place in the ore and also assists in separating gold and silver from acid, iron-oxide, volatile and other deleterious elements as the ore mixes and unites with the oxygen of the atmosphere which flows directly down through the spokes of the shovels which intermittently come into moving contact with the radiating plates HP. This electrical heating means is entirely independent of the oil or other heat that is applied to the bottoms and opposite sides of the floors of the retort, but it is intended to be used in cooperation with it, at the same time. However, where oil, gas or coal is more expensive than electricity, and the radiating plates HP may be multiplied across the floors of the retorts to such an extent that the ore can be chemically converted from hard crystallized sulphides to soft soluble sulphates and to oxides by the electrical heat itself, and if desired an intense electrical heat can be obtained all over the entire area of the ore oxidizing surface of the floor by placing an electric current resistance plate of German silver or any other suitable electric current resisting material over the top surfaces of the radiating plates throughout the whole length and width of the floors of the retorts and sufficient current run into it to heat it as hot as desired.

Figure 39 illustrates a cross sectional view through one of the upper ore oxidizing floor sections showing the electric heating apparatus in recesses formed at the meeting edges of each two slabs of the fire clay flooring of the skeleton floor castings. Figure 38 shows the shoveling edge of a shovel in contact with the surface of the hot plate as it passes over it. The atmospheric air flowing into the retorts through the inlet pipe flows into the air apertures in the hub and spokes to the under side of the shovel blade to the plate. The oxygen of the air passes into the ore with the heat from the plate and removes rebellious and deleterious elements.

Figure 40 is a perspective view of a full length ore oxidizing section of either the upper or lower retorts of the furnace, showing a thin plate of a current resisting metal such as German silver or tungsten, or other suitable metal, of the full length and width of the ore oxidizing floor of the section of the retort laid down on top of the electrically heated hot plate casings and which is heated by them in addition to the heat applied by the oil burners to the under side of the floors and opposite side edges of the sections of the retorts.

Figure 41 is a cross section of the ore oxidizing retorts and their supporting walls, showing electrically heated hot plate casings arranged between the meeting edges of the fire clay floor blocks and the arrangement of their heating electrodes and their current flowing circuit wires.

Figure 42 is a fragmentary cross sectional view of the fire clay floor blocks and of a hot plate casing and its heating electrode of the lower retort. This view is about one half full size.

Figure 43 is a fragmentary cross sectional view of the fire clay floor blocks of the upper retort showing a hot plate casing and its heating electrode in sections, the two arrangements of the current circuit wires and their contacting terminals with the electrode being slightly different in the upper retort from that illustrated in the lower retort. The electrode may be a carbon rod or a rod of tungsten or a group or cable of tungsten or other current resistance wires.

Figure 44 is a longitudinal sectional view through the lower retort showing on the same scale as Figures 42 and 43 the cooperative arrangement of the current circuit wires which are permanently placed in contact with the opposite ends of the electrode and their resilient terminal contacting ends which rest resiliently against the resilient ends of the vertical circuit wires which extend down through the ash pit and out of it through its floor and the adjacent side wall of the retort furnace.

Similar letters of reference refer to similar parts through the several views.

My present invention embodies several new and novel improvements in the muffled retort ore treating furnaces at present in use. I preferably illustrate the preferred construction of my invention in a two muffled retort furnace in which the retorts are of the same size and of preferably the same length placed one above the other. The retorts are supported and enclosed by opposite side and end wall members, the wall members and retorts being provided with flues, and a heating means to heat said flues and said retorts to oxidize ores therein. A new ore moving and stirring apparatus is provided that is either adjustable or fixed as desired for moving the ore through the retorts. Different arrangements of the retorts are shown that greatly increase the tonnage capacity of a furnace without materially increasing its floor area.

The furnaces however that show my invention best are illustrated in Figures 1, 2, 3, 4 and 5. The furnace represented in Figures 1, 2 and 3 is composed of five sections of the retorts secured together in end to end alinement, as will be clearly explained hereinafter, while the furnace illustrated in Figures 4 and 5 is composed of six sections of the retorts secured together in end to end alinement. Consequently the furnace shown in Figure 1 is composed of an uneven number of sections while the furnace shown in Figure 4 is composed of an even number of sections. In making up a retort furnace of an uneven and an even number of sections a slightly different arrangement of the oil burners, their supporting frames and of some of the other parts of the operative features is necessary, which will be explained in the detailed description of them.

Different arrangements of the flowing fuel conveying and burning apparatus are shown. In one of these the oil burners and their supporting frames are of different lengths. The oil burner supporting frames in the five-section retort furnace are placed adjacent to each other throughout the length of both sides of the lower and upper retorts and each is the same length as an independent section of the retort as shown in Figs. 1 and 2. In the six-section retort furnace the oil burner supporting frames are only one-half of the length of the independent sections of the retorts and the spaces between them are filled up with fire brick, as shown in Figs. 4 and 5. This latter construction is provided in case the number of oil burners shown do not properly heat the ore, to allow the brick work between any two oil burners to be removed and another oil burner and its supporting frame to be inserted. Such an addition might be required at the opposite end portion of this furnace, when a particularly complex refractory and rebellious ore is to be oxidized, as for instance, in a custom ore treating mill, but with ore of the general average of sulphur content additional oil burners will not be needed. The immediate oil burners between the opposite end burners can be shut off and outside and middle burners will maintain the oxidizing heat required within the retorts. Thus, the brick work could be removed from the outside of either one or both of the two opposite outside end oil burners and another oil burner and its supporting frame could be placed at the extreme rear end or extreme front end or at both ends. Then there would be two burners at either one or both ends, side by side, and if they were not enough still another burner and its frame could be inserted at either one or both ends between the present shown opposite end burners and one next to them, which would be the second one from the end. There would then be three oil burners and their frames on the side walls at either one or both ends of the furnace side by side and discharging a heat flame as long as the combined length of the three oil burner supporting frames against the opposite side edges and the bottoms of the ore oxidizing floor sections of the retorts. Consequently this short length oil burner support frame has an advantage in long furnaces, that is 60, 80 and 100 or more feet in length.

In the five or uneven number retort section furnace, illustrated in Figures 1 and 2, the oil burner supporting frames are made the full length of the sections which may vary from four to twelve feet long, the length being governed by the weight of the sections, as they should be of a length that can be easily handled by workmen when constructing and assembling the members of the retorts together. These full secton length oil burner supporting frames distribute the heat flames from the oil burners in a continuous stream throughout the whole length and breadth of the opposite side edges of the floors and also across the entire bottoms of the lengths and breadth of the bottoms of the ore oxidizing floors of the retorts. The flames and heat from the oil burners flowing from them in the directions of the dotted lines shown in Figures 2 and 3, which show that the flames and the heat from the oil burners are carried by the air from the air blower AB, from the frames against the side edges and also against the bottom of the floors of the retorts. The flames and heat from the burners cross each other in opposite directions, throughout the entire length and breadth of the retorts. Consequently there is not any part of the opposite side edges of the floors that ore would lie against, as it is moved along the floors through the retorts, and also there is not any part of the width and length of the bottoms of the floors of the lower or upper retorts that does not continuously receive the direct impact of the flames and heat as it flows from the oil burners and their heat distributing oil burner supporting frames. In addition to the side burners 8 and their frames along the opposite sides of the retorts, one or two or more burners are also placed in the rear end RE of the furnace.

My invention is for retort furnaces having two, or four, or six, or eight, or more retorts, arranged in a horizontal plane, one above the other, and one of the most essential objects of my invention is to provide heating means for each retort independent of and separate from the heating means of each of the other retorts, but at the same time in addition to that of the lower retort.

In practically all of the furnaces in use of this type, the retort or the retorts above the lower retort have had no independent means of heating and consequently they have simply been ore warming up and drying retorts. It has only been when the heat applied to the lower retorts has been raised up to a much higher degree above what was necessary to roast the ore in the lower retort that even the beginning of the condition necessary to volatilize the sulphur in an ore could be made in the upper retort, without the danger of burning a hole through the bottom of the ore roasting floor sections of the lower retort. This catastrophe has actually taken place in an attempt to get a high enough heat against the bottom of the floor sections of the upper retort to commence the actual conversion of the ore in the upper retort. It is obvious that my present invention is a very valuable improvement, because if the floor sections of the lower retort are burned out, in the old type of construction the furnace has to be taken down, in order to replace the burned out sections with the new ones. My present invention, however, in order to overcome the expensive work of tearing down a furnace, provides means for removing the floor sections of each of the retorts from them, without in any way having to remove the outside side walls of the furnace.

Consequently my present invention, not only provides among other improvements the means for heating each direct heat muffled ore roasting retort independently of the heating means of each of the other retorts in a furnace and thus results in actually starting the volatilization of the sulphur from the ore in the upper retort, but also provides the means for removing one or more ore roasting floor sections of any of the retorts that may become cracked or blistered, or warped or have a hole burned through them, without removing or disturbing the outside brick or metal walls of the furnace, or removing the other floor sections of the retort or retorts.

In the drawings the numerals 1 and 2 designate the opposite foundation side walls and the numerals 3 and 4 designate the opposite end walls upon which my retort furnace rests. These foundation side and end walls are preferably made of fire clay brick but if preferred they may be built of reinforced concrete or of other material. The cast iron oil burner supporting frames 5 as shown in Figure 2, which frames also form wall members that are somewhat similar to those disclosed in application Serial No. 216,379, filed August 28, 1927, in which application, I am a joint inventor.

Upon the opposite side foundation walls I place cast iron plates 6, upon which I place cast iron oil burner supporting frames 5 to the front faces 7A of which, I secure oil or gas burners 8. These oil burner supporting frames are provided on their inner surface with diverging partition walls 9 and 10 that diverge upwardly and downwardly from a central aperture 11 in the face 7A of the frames through which the nozzle 8A of the oil or gas burner extends. In addition to the upward and downward partition walls 9 and 10 the frames 5 are provided with sidewise diverging partition walls 12 and 13, that extend in substantially vertical planes but in opposite directions from the nozzle entering aperture 11, to the opposite ends of the frames which may be of any predetermined length but which are preferably made as illustrated in the Figures 1 and 2 of the drawings, eight feet six inches long but are made shorter than eight feet six inches long in Figures 4 and 5. These oil burner supporting frames can, however, be made of any predetermined length as will be more fully explained hereinafter.

Each oil or gas burner 8 is provided with a flange 14 that is removably bolted to the face of the frame 5, and the frames 5, and the wall plate 6 are bolted to the foundation side walls 1 and 2 by anchor bolts 15, and the frames 5 are also provided with top and bottom sides 7B and 7C, that are formed at right angles to their face portion 7A.

These oil burner supporting frames 5, may be of any desired shape or form that is best suited to support the type of oil burner or gas burner that it is desired to use to heat the retorts, but in the drawings, I have illustrated a well known type of oil burner that is patented to the manufacturers thereof, and consequently it does not form any part of my invention, but I illustrate it as I intend to use it to heat the opposite side edges and the bottoms of the retorts of my furnace.

The length and width of the floor members of the ore oxidizing retorts define the tonnage capacity of them per twenty-four hours. The retorts 14A and 15A when built into a furnace are long tunnel like members, but for convenience in handling in the course of construction they are made in short sections which are secured together in end to end alinement.

Any predetermined length may be given to the sections but the length owing to the weight of the parts of the section should be as long as can be conveniently handled by workmen when erecting a furnace and building the retorts in it.

I preferably make the sections seven feet and ten inches long and I construct each section of four separate but cooperating pieces. The floor member 16 is made by itself and separate from the other members of the section of the retort. The two opposite side plates 17 and 18 are made separate from the floor section and the roof section 19 is made separate from the opposite side sections. All of these four pieces of a section are made exactly the same length. They are each provided with short overlapping ends, 19A and 20, that are constructed in reverse order so that they will connect with similar overlapping ends of the other sections that are built into a retort.

These four parts of each section may be made of the same metal or material, or of different materials. Thus all four of them can be made of cast iron castings, or the floor sections can be moulded out of fire clay into the form of the floor section 16 shown, or the cast iron floor section can be made of skeleton form as shown in Figure 10, that is, with very large openings 21 in its bottom and with only narrow ribs 22 across it. Flat slabs of fire clay 23 can be laid on it that are long enough to rest on the outer ribs of the floor section. The cast iron sides of each section as well as the roof member can be lined with asbestos boards 24 and 25 respectively, which will retain the heat within the retorts. The floor sections can also be cast of other metals than cast iron, such as malleable iron, steel castings, nickel-aluminum, tungsten, alloys of German silver or other metals. I preferably use cast iron with such additions of fire clay and asbestos as are herein mentioned.

The floor member 16 consists of an ore roasting flat bottom portion 16A, that has opposite side edges 16B that flare outwardly slightly and from each of their upper ends horizontal flange member 16C, which I will term track members (as the rollers of the links of the ore moving apparatus rest and run on top of them), extends outwardly a short distance and rests on inwardly projecting shelf portions 26 that are cast on the inner side surface of the opposite side plates 17 and 18. They are secured thereto against accidental displacement therefrom by providing their end portions 16D with a downward projecting lug member 16E that hooks into a recess 26A formed in the upper surface of the shelf member 26 of the side plates 17 and 18.

In some cases it would be desirable to cover the cast iron track members 16C, of the cast iron floor members 16, with thin steel track members TM as shown in Figures 36 and 37. They would wear longer than the cast track members but at the same time the cast iron track members would last several years, as solid imperforate cast iron floor members have been used in muffled retort furnaces for about four or five years.

The principal objection to cast iron is its tendency to be gradually corroded to the extent of having to be replaced every few years, and it is for this reason that the skeleton floor construction which is the preferred construction, is covered with fire clay slabs, and the inside surfaces of which form the ore roasting floors and the ore converting surfaces of the retorts.

My invention consequently contemplates the use of solid imperforate cast iron floor castings, due to its superior strength against accidental breakage from rough handling and its heat radiating qualities, as it very quickly radiates heat through the bed of ore on its floor surface which may be anywhere from a half inch to about three inches deep.

In case of the skeleton floor casting, all of its cast iron surface that chemicals in ores would attack are covered and protected from them by the fire-clay slabs and the fire-clay cement used to close the cracks between them, except the tops and the outside edge portions of their track members. Whenever a furnace is to be used continuously or ores that contain chemicals that would corrode the cast iron track members, the thin strips of sheet steel can be secured to the top surfaces of them along the length of each section of the skeleton floor members as shown in Figure 36, by screws 36A.

If desired this steel track member can be made of angular shaped structural steel as shown in Figure 37 and in addition to being secured to the tops of the cast iron track members, can be removably bolted to the opposite sides of the sections of the retorts by bolts 37A.

In case it is desired to thoroly protect the cast iron track members from corroding chemicals in the ores being roasted, then just before the steel strips are secured to the track members a thin spread of fire-clay cement should be laid on top of the cast iron tracks and then the steel tracks should be laid on it and be secured to the cast iron tracks before the cement dries. The cement together with the steel tracks will thoroly protect the cast iron tracks from corroding elements.

The side plates 17 and 18 of each section of the retorts are vertical plates that are each provided with an outwardly projecting foot flange 27, that rest on top of the oil burner frames 5, and are bolted to them. They also rest on top of the brick work 28 between the oil burning frames in furnaces where brick work is placed between the oil burning frames as in Figure 4, and are each provided with a depending lip 29 that projects down past the inner edges of the oil burning frames 5, and the inner edge of the brick walls 1 and 2.

The upper terminal edges 30 of each of the side plates 17 and 18 have a straight and slightly tapering recess 31, formed down into and between two upwardly projecting lugs 32. The opposite ends 17A and 19B of the roof member 19 of each section are provided with a downward projecting lug member 33 that extends along their whole length and are slightly tapered to fit loosely into the grooves 31.

The opposite ends of the roof member 19 are also provided with a pair of upwardly projecting lugs 35 and 36, between which a tapering recess 37 is formed.

The lower inner edges 39 of the oil burner frames 5 are provided with a depending lip 40 that extends over the inner upward projecting lug 36 against or, very close to it. A short angle plate 41 is secured to the inner surface of the lower end 39. The lower terminal end of the angle plate 41 fits down into the recess 37 between the lugs 35 and 36.

This construction makes a very firm and substantial connection of the inner lower end of the upper row of oil burners with the opposite ends of the roof members of the lower retort. The connection will prevent any possible inward or outward accidental movement of the oil burner frames to or from the side plates 17 and 18 of the retorts. The upper row of oil burning frames are supported at their outer ends on spacing trusses 42 which are bolted at their lower ends to the top plates 7B of the lower row of oil burning frames. These trusses 42 consist of vertical bracket shaped cast iron members that are several inches wide and that have flat horizontal foot and head plates 43 and 44 at their opposite ends, that are bolted to the top of the lower row of oil burner frames and to the under side of upper row of oil burner frames. After they and the upper oil burner frames are set and secured in their proper positions and relation to the side plates of the lower retort, the fire clay brick wall is built up around and between and in front of them.

In addition to the side oil burners 8, and their supporting frames 5, one or two or more oil burners which I will call rear end burners REB, and their supporting frames RSF, can be placed at the rear end RE of the lower retort of the furnace as shown in Figures 3, 13 and 14. These rear end oil burner supporting frames have to be set enough lower than the side oil burner supporting frames 5 to bring their upper edges UE underneath and up against the bottom of the floor of the lower retort at the end of the floor as shown in Figure 13. If desired the two immediately adjacent oil burners which I will designate here as 7D and 7E (Fig. 5) may be dispensed with, that is, they may not be built in the wall as shown in Figure 14, their place being taken by the brick side wall BSW. Then there is only one oil burner frame and oil burner shown which I will designate here as 7F and 7G on the opposite sides of the furnace between the rear end burners REB and the center burner which I will designate here as 7H of the retort. These particular numbers in this particular construction are shown in Figures 13 and 14. I use low-pressure or combination low and high-pressure burners and as the flames and heat of the oil burners flow directly towards the flue pipes FP in the lower flue LF of the furnace they increase the draft to and through the flues to the smoke stack SS. After the retorts are thoroughly heated up to the degree of heat required to satisfactorily oxidize an ore, which is only from about 350 to 500 degrees F. for the most generally mined ores, then either one or two of the end burners can be shut off and need not be lighted again unless more heat is required to roast the ore. The heat in the retorts is regulated by securing to the retorts at their opposite ends pyrometers which are connected to the retorts in such a manner as to properly register their internal heat.

While I have illustrated and described oil burner supporting frames 5 of a design that is especially adapted to spread the heat over the entire area of the opposite side edges and entirely over the entire area of the bottoms of the ore oxidizing floors of the two retorts, my invention contemplates any form or outline of an oil or gas burner supporting member or device or a plate members of any kind that is arranged to be supported, either wholly or partially on the top of, or that bolts to the outside surface of the side and end walls. Also my invention contemplates the brick, side and end walls provided with holes or apertures of any size or shape through which the heat from oil or gas burners flows to and against the floors of the retorts. In Figure 33, I illustrate a very much simpler and cheaper arrangement of an oil burner 8A and supporting plate 8B bolted to the outside surface of one of the brick walls. In this view 33 the hole or aperture in the brick wall through which the heat from the oil burner 8A enters into the flues below the retorts is formed in the brick walls as it laid up by the bricklayers. In relation to the heat used in roasting ores I wish to say that there are some characters of silver and lead sulphide ores that require heat up to and around 800 degrees F., to chemically change them from sulphites to sulphates, and while a little higher heat can be used without doing any harm to the ore, if much additional heat is used it will be a waste of oil or gas and if a very much higher heat is used it would burn the ore to such a degree that it would be apt to interfere with obtaining a high recovery of the gold and silver by amalgamation and also by the cyanide and other chemical treatments and precipitants. The upper flue 46 is formed by opposite side members 47 and 48 and the roof member 49 which is a duplicate of roof member 19 of the lower retort.

I have preferably provided the roof members 19 and 49 and the bottoms of the ore oxidizing floor members 16 with depending ribs 50 to strengthen them against breakage from rough handling, and to reinforce the center of their width against sagging in case the heat should accidentally run up to a degree that might cause their centers to sag a trifle if the ribs were not present, although the grade of cast iron castings used will stand a heat of about 2700 degrees F. before this takes place. The heat and smoke from the oil burners 5, that heat the bottoms of the floor sections of the lower retort, flow through the lower flue LF to the central portion of its length to the outlet aperture FP. The flue pipes 53 and 54 conduct heat from the lower flue LF through the flue pipes 53 and 54 to the middle flue MF where it is directed against the opposite edges and bottom of the ore oxidizing floor of the upper retort 14A.

In oxidizing some ores there may be sufficient heat penetrating the upper part of the interior of the upper retort to thoroughly oxidize them without conveying the heat from the middle flue MF through the flue pipes 59 and 60 to the opposite ends of the upper flue 46. A saving in fuel can be had by shutting off the opposite ends of the lower flue pipes 53 and 54 that extend to the opposite ends of the middle flue MF.

The heat from the flue pipes 53 and 54 enters the middle flue MF at opposite ends through the apertures 55 and 56. Upon entering the middle flue MF the heat flows through the central portion to the inlet apertures 57 and 58 of the flue pipes 59 and 60. The heat is then carried through the flue pipes 59 and 60 to the apertures 61 and 62 at opposite ends of the upper flue 46. From the apertures 61 and 62, the heat flows to the centrally disposed apertures 63 and 64 in the upper flue 46. These latter apertures are the entrances to the flue pipes 67 and 68 which in turn, are connected to the smoke-stack SS. The lower end 69 of the smoke-stack SS is provided with a damper 71.

The upper rows of oil burners 8 on the opposite sides of the furnace discharge continuously a large volume of flame and heat into the middle flue MF against the opposite side edges and against the bottom of the floor of the upper retort in addition to the heat that flows into its opposite ends from the lower flue pipes 53 and 54. Consequently the ore oxidizing floor and the interior of upper retort 14A may be heated by an independent and separate equipment of oil burners separate from the oil burning equipment that heats the ore oxidizing floors and the interior of the lower retort and is ample in every respect to oxidize the ore in the upper retort entirely independently of the flow of heat through these pipes. In order to independently heat the upper retort, the flue pipes 53 and 54 are provided with dampers 72 and the flue pipes 59 and 60 are provided with damper 75. Additional short cut pipes 76 and 77 can be connected to the pipes 59 and 60 at their inner ends, and be extended to and be connected to the base of the smoke stack. Dampers 78, however, should be inserted in the short cut pipes 76 and 77, in order that the flow of the hot air into the smoke stack can be controlled. By this arrangement the heat and smoke from the middle flue can normally be allowed to flow to the opposite ends of the upper flue and through it to the two smoke stack flues, by closing the dampers 78 in the short vertical flues 76 and 77. When oxidizing an ore that does not require heat from the middle flue, in addition to that of the oil burners at the opposite sides of the upper retort, the dampers 75 in the pipes 59 and 60 are closed and the dampers 78 in the vertical pipes 76 and 77 are opened to permit the heat to go directly up the smokestack.

My invention contemplates the use of electricity to heat and assist in the conversion of ores directly within and on the floors of the retorts. It is noted that electricity is a flowing fuel the same as oil, gas, or coal, any one of which may be used to heat the exterior bottom surfaces, the lower corners and the adjacent side edges of the retorts. However, oil and oil burners are preferably used for heating the exterior surfaces. The current carrying wires CW extend through either the side walls or up through the foundation walls within insulating tubes IT, to electrode members EM. The electrode members EM are embedded in electric current heating casings DC, (Fig. 38) the top surfaces of which become hot plates HP. The casings are embedded in moulded recesses MR, that are formed in the meeting edges of the non-conductive fire clay floor slabs 23. The heat given off by the hot plates HP heats the ore on the floors of the retorts and with the oxygen of the air which flows down through the passageways AP in the hubs and spokes of the shovels 86 drives from the ore volatile elements and other mixtures and combines with certain of the chemical compounds occurring in the ore.

My invention contemplates the employment of any kind of apparatus for moving the ore through the retorts and for rabbling or stirring it as it is moved along the floors 16 of the retorts from the ore feeding in hopper 79 at the front end FE of the retort. The hopper 79 receives ore through a chute or conveyor 80 from a storage bin or directly from machinery that has crushed and granulated it to preferably 40 mesh which is the best all around size for ores. 60 to 100 mesh is best for oil shales. The ore drops from the hopper on to the floor of the upper retort and is fed through the upper retort by the ore moving and rabbling conveyor. It then drops into and through a chute 81, on to the floor of the lower retort and is moved along it with the ore moving shovels to its discharge end where it falls into a spiral conveyor 82 through which it is conveyed and discharged from the furnace for further treatment. The first further treatment is to eliminate from it the salts and acids that would be detrimental to obtaining from it a high percentage of its gold and silver values by amalgamation. It is preferably, however, reground before it is given the amalgamation treatment. It can, however, be fed into a Huntington mill which regrinds it and at the same time mixes with it a quantity of mercury, after which it can be run over an amalgamating plate. Further treatments may be given such as cyanide solution treatment, a concentrating treatment on concentration tables and a flotation treatment, after which practically all of its gold, silver and lead values have been recovered. The zinc can be recovered by leaching and chemical solution and precipitating treatments. The copper can also be recovered by special leaching chemical solution and precipitating treatments. Platinum also, if any is present, can be recovered by chemical solution and precipitating treatments.

I do not illustrate any of the apparatus used in recovering the valuable metals from the ore after being oxidized as all of the treatments that I have enumerated are well known and are practiced in mills that are fitted with the proper machinery for effecting these several treatments.

I preferably employ, however, an ore moving and stirring mechanism that consists of two endless link chains 83 that run on track members 16C formed on the opposite sides of the retort. Each chain is made of flat links of preferably six inch pitch with preferably a roller 84 between their bolt connected ends. The chains are mounted on sprocket wheels at the opposite ends of the floor members 16 of the retorts. Each opposite link has at its center portion an aperture 80A formed at its central portion into which cross-bars 85 are fitted. The cross-bars may be of rectangular, channel, or any other structural shape. The opposite ends of the cross bars 85 are secured to the links against displacement from them by any suitable means, preferably by means of split pins 82A which are inserted in drilled holes at the ends of the bars. Upon the cross bars 85, I mount ore moving and stirring shovels 86. I mount them loose enough on the cross bars to allow their edges 87 to have a short lifting movement of about a quarter of an inch above the floor but which engage the floors of the retorts as they are moved through them by the endless link chains. The shovels are driven through the retorts in different periods of time varying from about ten minutes to sixty minutes, by means of a variable speed mechanism 88. This variable speed mechanism consists of a worm gear 89 mounted on and secured to the shaft 90 of the large driven sprocket wheels 91.

The endless chains are mounted on the large sprocket wheels 91 which are secured on the shaft 90 that extends through the opposite sides of a hood member 92 that is secured to and projects straight out from the front end FE of the furnace. The opposite ends of the shaft are mounted in journal boxes 93. The shaft at one end extends far enough beyond the adjacent box to receive the worm gear 89, which is engaged by a worm pinion 94. The worm pinion 94 is mounted on a shaft 95, that is journaled in a supporting frame 96. A long cone pulley 97 is secured on the shaft 95 and another similar cone pulley 98 is mounted in the frame parallel to it and with its peripheral surface close enough to it to clamp a driving belt 99 against the surface of the cone 97. A belt pulley 100 is secured on the shaft 101 of the pulley 98 on which a belt is mounted. The belt extends to a rotative source of power which is not shown.

The opposite loops of the endless link chains are mounted on large sprocket wheels 91A, that are secured on a shaft 90A that is slidably mounted in long slots 92A formed in the opposite sides of a hood member 93A that projects straight out from the rear end RE. Means are employed to automatically move the shaft of the sprocket wheels and the sprocket wheels in the slots and in the hood to hold the endless chain out taut on its tracks in the retorts.

My invention contemplates any means that will hold the endless chain taut on its tracks and around the sprocket wheel 91. I, preferably, however, secure one end of each lever 102 to each of the opposite ends of the shaft 90A. Each end of each lever depends below the hood and is pivotally fulcrumed between its ends by a bolt 103 to a box 104 that is secured to the bottom of the hood. The levers extend below the hood and box and are shaped so that one end of a bolt 105 extends through the lower end of each lever. A wheel form of nut 106 is threaded to the end of each bolt. The opposite ends of the bolts are pivotally secured to a block 107 by a bolt 10A and these blocks 107 are bolted to the adjacent brick end wall of the furnace. Coil springs 108 and 109 are mounted on each bolt on the opposite side of the lower end of each lever. The object of the springs is simply to stretch the chains out straight when cold and take up the wear in the joints every few months as the joints wear and the chain gets loose. In order to take up on the chains the nut 106 is tightened a little which tightens the springs. The lower end of the levers are held resiliently between the two springs 108 and 109 which will keep it taut during both its expansion movement from the heat and also during its contraction movement when the furnace is allowed to cool off. The slots 92A are closed as much as possible by side plates 110 that slide in slideways 111 formed on the opposite sides of the hood.

Eight ore moving and stirring shovels 86 are shown mounted on each cross bar 85 but one, or two, or three, or four made long enough to extend across the floor of the retorts may be used; by using two or more, however, each is more apt to bear on the floors with the full length of its shoveling edge especially if the surface of the floor sections are uneven. Each one of the ore moving and stirring shovels consists of a hub 112 and thin blade like spoke members 113 that stand at right angles to the hub. Their edges 11A, which move through the ore, are tapered to knife like edges. These thin blade-like spokes extend in opposite directions from the hub. At their ends flat wide shovel members 86A are formed centrally from each side of the spokes and at the right angles to them. The shovels have thin edges 87 which engage the floors by gravity as they are mounted loose enough on their cross bars to allow their thin shoveling edges to bear with their weight on the floors when they are moved through the retorts. The shovels when moving through the retorts rest with one of their shoveling edges bearing on the floors of the retorts. They move and stir the ore in the following manner: the upper surface of each one of the shovels tapers upwardly at a slight incline from the opposite thin edges of the shovel to the center of the width of the shovel. The center of this double upward inclined surface is preferably about ½" above the level of the thin edges, and this double upward inclined surface of the shovel is formed into a succession of curved recesses 12A, which act to hold the ore momentarily as it flows into them and as it piles up on the shovels it is moved forward through the retorts by the forward movement of the shovel. The inclined recessed surface of the shovel forms a moving abutment that causes the ore to continuously pile up on top of the surface of the shovel but at the same time it continuously flows out of the recesses and off from its raised rear edge 116, while the ore that is above the shovel falls down onto the floor back of the high edge of the shovel into the space back of the shovel that is formed as the shovel moves forward through the ore. Consequently the ore is automatically turned over and over upon itself by the forward movement of these inclined shovels which are set so that their thin edges 87 scrape along the floor by their weight, which is enough to always keep the edges of the shovels against the floor and underneath the ore. Thus assuming that the ore on the floors is being fed and maintained at a uniform depth of one and one-half inches deep, then the ore that is lying down against the floor will be raised up on the shovel as the shovel moves along underneath it. As the high edge of the shovel is three-fourths of an inch above the floor which is one-half inch of the depth of the ore, the ore that is above the shovel is three fourths of an inch deep and falls down onto the floor back of the high edge of the shovel as fast as the shovel moves ahead. The ore that is moved up on top of the shovel by the forward movement of the shovel flows on top of the ore that has fallen down from the top portion from the top of the shovel to the hot floor of the retort. In my pending application above referred to, similarly shaped ore moving and stirring rabblers are shown which are rotated in intermittent step movement as they are moved through the retorts, but in my present invention the stationary shovel illustrated performs the same results, that is, substantially and practically turning the ore over and over upon itself as they are moved through the retorts by the endless ore moving and stirring mechanism which also pushes it through the retorts.

In the Figures 34 and 34A I illustrate a construction of the shovels that allows their high ends 116, that is, their ore discharging ends to be either raised or lowered and at the same time keep their shoveling edge down against the floors of the retorts. This vertical adjustment of the high end of the shovel is effected by making the shovel blade separate from the spokes and connecting them together by a sliding pivotal joint formed by the oblong slots 124 in both parts and a clamping bolt 125 which is arranged to clamp them pivotally together. Rods 126 are pivotally connected at their outer ends to lugs 127 formed on the shovel blades between their pivoted joint and their discharging ends. The outer ends of the rods are threaded and extend through lugs that project from the hubs of the shovels. Nuts 128 are threaded to their ends and bear on opposite sides of the lugs. By turning the nut down against the lug the high end of the shovel is raised and by turning it back to raise it from the lug the weight of the high end of the shovel causes it to lower towards the floor of the retort. When treating an ore right along month in and month out of the same character from one or more mines the fixed type of shovel is all that is needed as the shovel can be adapted as to its inclination and to the heights of its ore discharging end, to suit the depths at which that character of ore can be run through the retort. But in a custom mill where all kinds and characters of complex rebellious sulphide ores have to be oxidized, shovels having vertically adjustable inclinations of their ore shoveling surface which defines the different heights of its ore discharging edge from the floor is essential in order to obtain the best ore moving and stirring result. In case there are two or three or four or even eight ore stirring shovels mounted on each cross bar (eight are shown in the cross section in Figure 3), they can all be raised or lowered from opposite sides of the retort by providing a horizontal rod 129 which extends through lugs 130 on all of the shovels. Then when the two outside shovels are raised, the intermediate shovels will be raised also as shown in Figures 34 and 35. The entire shovel is loose on its supporting cross bar. The angle at which the shovels are constructed relative to the floors of the retorts will always hold the edge of each shovel blade by its weight down against the floors of the retorts, regardless of the height of the high or ore discharging end of the shovel blade. The shovel blades, however, on ores that are fed to a depth of from 2 to 3 inches deep through the retorts should be run anywhere from one-half to two-thirds of the whole depth of the ore. This heating insures a more uniform oxidation of the ore. On such ores as cannot be run anywhere from one half to one and one-half inches deep, the shovels can be set at an inclination that will run through them either one-half of the depth or three-fourths of it or the shovels can be inclined so that their top edges will be the full depth of the ore at the option of the operator of the furnace.

Air and steam inlet pipes 117 and 118 are shown connected together at the central portion of the length of each furnace and also at the opposite ends of each furnace. They are provided with valves that admit air or steam to a single pipe SP which is extended into the retorts. Air is used altogether on ores. The air enters the retorts through the passageways AP in the hubs and spokes of the shovels and down to and against the ore oxidizing floors of the retorts. It then flows up through the ore at the heel end 116 of the shoveling blades 117B. Thus the air which is heated by contact with the floors underneath the shoveling blades 117B, flows in and saturates the ore with oxygen as it flows up through it. The oxygen unites with the chemical elements in the ore and assists in converting the sulphides into sulphates. Its admittance to the retorts is essential from time to time commencing at about the time the sulphur commences to volatilize from the ore. The operating chemist is able to determine the time for the admittance of air by making tests of the ore which are made by inserting a long handled spoon into the oxidizing ore through the doors in the front side of the retorts during its feeding movement through the retorts. Any desired amount of air can be furnished by the blower $bb$ and its vertical pipe $bc$ and the horizontal pipe $bd$ that enter the retorts as shown at the right hand of the furnace in Fig. 3.

Steam is used only when oxidizing oil shales as it acts to assist in softening and disintegrating the oil shales. It is used almost wholly in the upper retort but if a little of it is needed in the end of the lower retort, that the oil shale falls on from the upper retort, it can be used there. However, if there is any gold, silver or other metals in the oil shale, air has to be admitted to the lower retort to assist in making the conversion from hard crystallized sulphides to soft soluble sulphates. Some oil shales contain platinum, gold, silver and other metals, or one or two of these metals in quantities that pay to recover them. In addition to recovering the oil, ammonia sulphate is recovered in paying quantities, and also potash. The air pipes extend to a supply of air under the pressure of from about 8 to 12 pounds per square inch and the steam pipe extends to a supply of low pressure dry steam.

In addition to the above means for providing heat in the muffled retorts, I illustrate in Figures 38, 39, 40, 41, 42, 43 and 44, an electrical heating means that will directly apply a very effective oxidizing influence to the ore and will thus materially assist in the treating of some complex rebellious ores. This electrically generated heat is applied in addition to the heat that is applied to the outside opposite side edges and the floor sections of the retorts. Thus in Figures 39 and 40, I illustrate perspective views of a skeleton floor section of one of the retorts on which fire clay floor blocks 23 are laid. Between their meeting edges which I mould to fit its opposite sides and ends, I insert a casting 23A which I term a hot plate casing that contains an aperture 23B in which an electrode 23C is inserted loosely and is removable from the open end 23D of the casing.

The electrode 23C may be a carbon rod, or a rod of tungsten metal or a built up cable or group of high resistance wires and at its opposite ends current circuit wires are arranged to contact with it. Any conductive terminal contact between the ends of the circuit wires and the opposite ends of the electrode may be used. I have preferably illustrated however, in Figures 41, 42, 43 and 44, two different preferred arrangements of the circuit wires and their terminal contacts with the opposite ends of the electrode which is made necessary by the manner in which I preferably arrange the hot plate casings in recesses in the meeting edges of the fire-clay floor blocks. In order to insert a new electrode in the hot plate casing, the casing is moved vertically from its recess. The electrical connection between terminal wires AB and the electrode is effected by the mere weight of the electrode resting against the wires which are supported in a slot AD at the meeting edges of the floor blocks by means of loop-shaped clips AE, as shown in Figs. 43 and 44. Thus, when the casing is raised to change an electrode the casing and electrode are free and unattached to the floor of the retort.

In the arrangement of the circuit wires of the lower retort the aperture in the casings is closed along its bottom except at the center of its length and the circuit wires are permanently confined within the bottom of the aperture and are arranged so that their resilient curved ends bear constantly against the opposite ends of the carbon rod. If a metal electrode is used the ends of the circuit wires can be soldered to its opposite end, consequently when the casing in the lower retort is raised up out of the floor blocks the circuit wires are lifted with it and these circuit wires effect a terminal contact at the center of their length as illustrated by being provided with resiliently springing ends AF that engage and rest on similarly curved springing terminal ends that are formed on the tops of the vertical circuit wires AG that extend down into a tube AH, that leads them out of the furnace through the ash pit and a side wall of it where the circuit wires extend to a source of electric current and to a ground. In the upper retort the circuit wires are carried laterally out through the fire clay floor blocks and the cast iron floor section of the retorts and the adjacent side wall to a source of electric current and to a ground.

The high resistance electrodes should be heated hot enough by the current that flows through them to heat the casings to preferably a low or a little above a low red heat. This heat heats the ore as it is moved through the retorts and the atmospheric air flowing into the retorts, especially that air that passes through the apertures of the spokes to the surfaces of the hot plates.

I have preferably illustrated three of these hot plate casings in the floor sections of Figures 39 and 40, but two or four of them can be used in each section of the retort if desired. One should be placed at each end of each section so as to lap over onto the edge of the next section and the other or others placed at equal distances apart between them. The circuit wires can be connected in any operative way to distribute the amount of current to each electrode to heat the same evenly to the degree of heat required. In case it is desired to use a smooth metal floor surface instead of the fire-clay floor surface, a thin metal plate AK of preferably German silver or other suitable metal can be laid on top of the fire-clay floor blocks and on top of the hot plate sections as shown in Figure 40.

My invention contemplates any kind or character of connecting joints between the different sections of each retort of the two retorts. I preferably use however, the joints illustrated in Figures 29 to 37.

In case this retort furnace is erected and operated at a mine or mill where oil is considerably more expensive than coal, a coal or other fuel burning grate 119 can be built into the lower flue and a door frame 120 with coal entrance doors 121 and ash pit doors 122 can be used for heating the lower retort instead of the oil burners or if desired as shown in dotted lines in Figure 6, several of the oil burners can be used with the grate fire to heat the lower retort up to the oxidizing temperature from a cold condition and then only one or two pairs of the oil burners may be used with the coal fire to maintain the heat required in the lower retort. But of course all of the oil burners should be used for heating the upper retort, from a cold state if plenty of oil can be had. If only a little oil can be had one or two pairs of the upper oil burners in addition to the coal fire should satisfactorily start the oxidizing of the ore in the upper retort. Finally if oil cannot be obtained economically, a large coal fire will satisfactorily oxidize ore, but as much of it can be oxidized in the same time as with the oil burners heating the upper retort independently of the heat that heats the lower retort.

The hoods are preferably made of sheet steel or iron but can be made of cast iron castings, and they can be lined with thin sheets of asbestos boards. They are each provided with a large door 123 that is locked to the lower end of the hood by a pivotal bolt 124. Journal boxes 93 are secured to the surfaces of the opposite outside surfaces of the front hood in which the shaft upon which the endless chain driving sprocket wheel is mounted. The operation is as follows: a metallurgical chemist should have charge of the operation of the retort furnace and if he is treating ores in a mill built to treat ores from one mine or two or more mines having the same character of ore he should make tests as often as it is necessary to keep acquainted with any changes that may take place in the ore as the workings of the mine are increased in depth, for the character and grade and values of ores frequently change with the depth of the workings in the mine. If he has charge of a custom ore treating mill in which ores of different characters are being oxidized, and then treated to recover their values he should test every different ore that is presented for treatment before tonnage quantities of it are run through the retorts. The testing of an ore or ores is accomplished by oxidizing small amounts of it in small dishes in muffled retort assay furnaces. The ores are also assayed in the same furnaces to determine their values. Different kinds of ore require different periods of time in which to oxidize them and also similar characters of ores containing a large percentage of sulphur require different periods of time in which to oxidize them; furthermore, one ore may be of such a character and quality that it can be run two inches deep through the furnace while another ore can only be run one and one-half inches deep and another one cannot be run over one inch deep and still another one cannot be run more than one-half inch deep. The chemist by oxidizing small samples can form an accurate idea of the depth an ore can be oxidized when fed through the furnace in order to give it a treatment that will completely convert its sulphides to sulphates.

Consequently it can be seen that the capacity of the furnace of any fixed length and width is determined by the above factors. To get at the capacity of the furnace for an ore or for a range of different ores running at different depths, the following course is pursued: assume for example, that the six section furnace is fifty feet long in its effective oxidizing floor surface, that is, on each one of its floors we would have for the two floors one hundred feet in length ore oxidizing surface. The drawings represent an ore oxidizing floor six feet wide and consequently each foot in length of the floor surface, if the ore was fed two inches deep throughout the entire floor surface of the retorts, would give a cubic foot of ore in each foot of length of the one hundred foot floor surface. Assuming that a cubic foot of ore weighs 150 pounds, this being the general average for gold carrying quartz ore, although most of them are heavy, and especially the lead, copper and zinc ore, as a rule we would have 150 times 100 cubic feet of ore which would be 15,000 pounds of ore. If it required thirty minutes in which to oxidize that ore, we would be able to oxidize in one hour two times 15,000 pounds or 30,000 pounds or 15 tons per hour. Then in each twenty-four hours run we would be oxidizing 24 times 15 tons, or 300 tons per day of 24 hours at 2 inches deep. At one and one half inches deep we would oxidize 225 tons, one inch deep 150 tons, at ¾ inch deep 112 tons and ½ inch deep 75 tons. The most general of the ores mined can be fed through the furnace at from ¾ to 1½ inches deep and some of them can be oxidized in 10 minutes, some in 15 minutes, some in 20 minutes, others in 25 minutes and others in 30 minutes. However, there are some very complex rebellious ores that require more time than 30 minutes in which to oxidize them and consequently the tonnage per day would be less than estimate given, but it can be seen that the tonnage of the ores that can be oxidized in 10, 15, 20 or 25 minutes will be greater than the tonnage of ores that requires 30 minutes to oxidize them. For example if an ore can oxidize in 20 minutes and we are oxidizing 15,000 pounds in that 20 minutes we would be oxidizing 45,000 pounds in one hour, which would be about 7½ tons more each hour than if the ore required 30 minutes to oxidize it or about 180 tons larger tonnage per 24 hours.

My invention provides a new type and arrangement of a muffled retort ore oxidizing furnace and while it uses a multiplicity of oil burners they are of such low pressure that it will economize in fuel from those that are in general use. The detail construction of its various parts provides that different members of the retorts be made in single easily constructed and easily put together pieces. Its rabbling mechanism is simple, inexpensive and effective in thoroughly progressing and rabbling and stirring the ore as it is moved through the retorts. Its upper retort is heated and the conversion of the ore from sulphides to sulphates is positively started in the upper retort which is an entirely new feature from those in common use. Its floor members are constructed in such a manner that they can be removed from the retorts without tearing down the outside walls of the furnace and while I have illustrated and described the preferred construction of my muffled retort furnace I do not wish to be limited to the construction and arrangements as described and illustrated, as many changes may be made in it without departing from the spirit of my invention.

Having described my invention what I claim as new and desire to secure by Letters Patent is:—

1. In a muffled-retort ore-oxidizing furnace, the combination of supporting walls with a plurality of retorts mounted thereon and provided with a plurality of non-conductive floor members, heat conveying flues, electric current circuit wires extending into said furnace to the said non-conductive floor members, a heat conducting casing embedded in said non-conductive floor members, and an electrode within said casing arranged to heat said casing.

2. In an ore-oxidizing muffled-retort furnace, the combination with side and end foundation wall members of a plurality of retorts each comprising opposite side members, a floor member and a roof member, said side members each comprising a straight rectangularly shaped piece of metal provided with a right angle foot member extending outwardly therefrom and resting upon said side foundation wall members and an inwardly projecting shelf member, and having its upper edge releasably engaged by an edge of said roof member, said floor member being dish-shaped transversely of its length and consisting of a flat wide horizontal portion and opposite short upwardly projecting side edge portions, and outwardly extending lug members projecting from said side edge portions over and resting upon shelf portions of said opposite side foundation walls.

3. In a muffled-retort ore-oxidizing furnace the combination of supporting walls with a plurality of superposed retorts therein each comprising side members, an ore-oxidizing floor member releasably supported by said side members and arranged to be removed therefrom without tearing down said supporting walls, and a roof member fitting on said side members; said ore-oxidizing floor member having upwardly projecting side edges with flat track members extending therefrom to the inside surfaces of the adjacent side members; and an ore moving and stirring endless chain conveying mechanism within said retorts comprising a pair of endless link chains mounted along the opposite sides of said retorts and connected to a variable speed power operated mechanism arranged to move said chains in different predetermined periods of time through said retorts; metal rods connected at their opposite ends to the links of said side endless chains and extending transversely across the ore oxidizing floors of said retorts; and ore shovels mounted loosely enough on said rods to have a short adjusting movement thereon, said ore shovels having shoveling edges bearing against said floors; and means including resilient members for taking up the wear of said endless chains and holding them taut.

4. A muffled-retort ore-oxidizing furnace comprising a plurality of superposed retorts each composed of separate side, floor and roof members, the said ore oxidizing floor member of each retort being releasably attached to its side members and having upwardly projecting side edges carrying track members so arranged that each floor member is dish-shaped, an ore moving and stirring endless chain conveying mechanism, the chains of which are mounted on said track members and the stirring members of which are arranged to move under the ore to raise it up and cause some of it to drop down on the floor behind them while pushing some of the ore ahead of them as they are moved with a continuously forward movement through said retorts, means for feeding ore into the uppermost retort, means for withdrawing oxidized ore from the lowermost retort, means for heating the retorts, a variable speed power operated mechanism arranged to move said ore moving and stirring endless chain conveying mechanism at different predetermined periods of time through said retorts, metal rods connected at their opposite ends to the links of said side endless chain and extending transversely across the ore oxidizing floors of said retorts, shovels mounted loosely enough on said rods to have a short adjusting movement thereon, said shovel members consisting of a hub member and thin spokes that stand at right angles to the hub members and extend in opposite directions therefrom and thin shovel blades that stand at right angles to the spokes and bear with their ore shoveling edges against the floors of said retorts by gravity; the said shovel blades being positioned on the opposite ends of said spokes so that one of the shoveling blades will bear on the floor of one retort and the other shoveling blade will bear on the floor of the next lower retort, means for adjusting the shoveling blades to any predetermined angle of ore shoveling inclination to the floors, and means including springs for holding said endless link chains taut on said tracks and sprocket wheels as its joints wear.

5. In an ore-oxidizing muffled-retort furnace the combination of supporting walls with a plurality of superposed retorts therein having hoods at their ends, said retorts each comprising side members, a roof member on top of said side members and an ore-oxidizing floor member having upwardly projecting opposite side edges with track members thereon extending from them to the inside surfaces of the adjacent side members of the retort, means for releasably securing said ore oxidizing floor members in operative relation to said side members, sprocket wheels journaled in said hoods, an ore moving and stirring endless roller chain conveying mechanism the rollers of which are mounted on said tracks and the side chains of which pass over said sprocket wheels, means including spring controlled lever mechanism for holding said endless chains under a resilient tension on said tracks and sprocket wheels, a variable speed power operated mechanism arranged to move said chains in different predetermined periods of time through said retorts, metal rods connected at their opposite ends to the links of said side endless chains and extending transversely across the ore-oxidizing floors of said retorts, ore shovels mounted loosely enough on said rods to have a short adjusting movement thereon; said shovel members consisting of a hub member and thin spokes that stand at right angles to the hub members and extend in opposite directions therefrom, and thin shovel blades that stand at right angles to the spokes and bear with their ore shoveling edges against the floors of said retorts by gravity; the said shovel blades being positioned on the opposite ends of said spokes so that one of the shoveling blades will bear on the floor of one retort and the other shoveling blade will bear on the floor of the next lower retort, and means for adjusting the shoveling blades to any predetermined angle of ore shoveling inclination to the floors.

6. In a muffled-retort ore-oxidizing furnace the combination of supporting walls with retorts supported thereby, flues in said walls and between and above said retorts, ore moving and stirring mechanism in said retorts, hoods on said retorts, doors on said hoods hinged at their top edges and extending to and releasably fastened to their lower edges, fire clay floors in said retorts supported by skeleton metallic floor members, track members carried on said floor members, and asbestos side boards and roof members in said retorts.

7. In a muffled-retort ore-oxidizing furnace the combination with supporting walls of a plurality of superposed retorts each having a hood at its opposite ends, a pair of sprocket wheels rotatably mounted in each of said hoods, means for slidably moving one pair of said sprocket wheels, means for rotating the other pair of sprocket wheels, a shaft secured to the sliding pair of sprocket wheels, a lever secured to the one end of said shaft, a bolt rod secured at one of its ends to the adjacent wall and having its free end extending through the free end of said lever; springs mounted on said rod on the opposite sides of said lever, nuts threaded on the ends of said rod and bearing against the ends of the adjacent springs, endless chains, ore moving members mounted on said chains, and means including slideways in the opposite sides of said hood for supporting slidably said shaft whereby said endless chains are automatically held taut in said retorts and hoods.

8. A muffled-retort ore-oxidizing furnace comprising supporting wall members, retorts supported by said wall members and provided with non-conductive ore oxidizing floor members, heat receiving flues arranged to convey heat to said retorts, means including electric current conveying wires extending through said wall members to said non-conductive floor members, electric current heated casings embedded in said non-conductive floor members, and electrodes in said casings connected to said current conveying wires and arranged to heat said casings.

9. A muffled-retort ore-oxidizing furnace comprising supporting wall members, retorts supported by said wall members and provided with a plurality of non-conductive ore-oxidizing floor members, heat receiving flues below and between and above said retorts, and electrical current heating means disposed in recesses formed at the contacting edges of the floor members of the retorts.

10. In a muffled-retort ore-oxidizing furnace the combination with supporting walls of retorts within said walls and flues for heating said walls and said retorts, said retorts being provided with opposite side members, and an ore-oxidizing floor member comprising a flat wide central floor portion and upwardly projecting opposite side members carrying horizontally disposed terminal members extending to the opposite side members of said retorts, and means including the horizontally disposed terminal members for supporting said floor member in operative relation to said retorts and its opposite side members.

11. In a muffled-retort ore-oxidizing furnace the combination with supporting walls of retorts within said walls and flues for heating said walls and said retorts, said retorts being provided with opposite side members and an ore-oxidizing floor member comprising a flat wide central floor portion and vertically projecting opposite side members carrying horizontally disposed terminal members extending to the opposite side members of said retorts, and means for supporting said floor member in operative relation to said retorts and its opposite side members, the said flat floor portion of said floor member being provided with large openings bounded by transverse ribs and longitudinal members.

12. In a muffled-retort ore-oxidizing furnace the combination with the supporting walls of retorts within said walls and flues for heating said walls and said retorts, said retorts being provided with opposite side members and an ore-oxidizing floor member, said floor member comprising a flat wide central floor portion and vertically projecting opposite side members carrying horizontally disposed terminal members extending to the opposite side members of said retorts, means for supporting said floor member in operative relation to said retorts and its opposite side members, the said flat floor portion of said floor member being provided with large openings bounded by transverse ribs and longitudinal members, and a refractory floor member laid on top of said flat floor portion of said floor member and against its opposite vertical side members.

In testimony whereof I affix my signature.

HOWARD S. BAILEY.